United States Patent
Shimizu (10) Patent No.: US 10,259,446 B1
(45) Date of Patent: Apr. 16, 2019

(54) HYBRID VEHICLE

(71) Applicant: TOYOTA JIDOSHA KABUSHIKI KAISHA, Toyota-shi, Aichi-ken (JP)

(72) Inventor: Yu Shimizu, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/125,927

(22) Filed: Sep. 10, 2018

(30) Foreign Application Priority Data

Oct. 16, 2017 (JP) .................. 2017-200411

(51) Int. Cl.
| | |
|---|---|
| *B60W 10/08* | (2006.01) |
| *B60W 20/10* | (2016.01) |
| *B60K 6/442* | (2007.10) |
| *B60K 6/365* | (2007.10) |
| *B60K 6/26* | (2007.10) |
| *F16H 3/72* | (2006.01) |

(52) U.S. Cl.
CPC .............. *B60W 20/10* (2013.01); *B60K 6/26* (2013.01); *B60K 6/365* (2013.01); *B60K 6/442* (2013.01); *F16H 3/724* (2013.01); *B60W 2510/085* (2013.01); *B60W 2530/00* (2013.01); *B60W 2540/10* (2013.01); *B60W 2710/30* (2013.01); *B60Y 2200/92* (2013.01); *B60Y 2300/192* (2013.01); *B60Y 2300/60* (2013.01)

(58) Field of Classification Search
CPC ....... B60W 10/08; B60W 10/24; B60W 10/26
USPC .................... 180/65.285, 65.29, 65.8
See application file for complete search history.

(56) References Cited

U.S. PATENT DOCUMENTS

| | | | | |
|---|---|---|---|---|
| 6,161,640 | A * | 12/2000 | Yamaguchi ............. | B60K 6/445 180/65.8 |
| 7,099,756 | B2 * | 8/2006 | Sato ..................... | B60W 10/08 701/22 |
| 7,584,813 | B2 * | 9/2009 | Yoshida .................. | B60K 6/48 180/65.29 |
| 7,750,505 | B2 * | 7/2010 | Ichikawa .............. | B60W 20/13 307/82 |
| 7,795,844 | B2 * | 9/2010 | Ichikawa .............. | B60W 20/13 320/134 |

(Continued)

FOREIGN PATENT DOCUMENTS

| | | |
|---|---|---|
| JP | 2016-084088 A | 5/2016 |
| JP | 2017-061271 A | 3/2017 |
| JP | 2017-065604 A | 4/2017 |

*Primary Examiner* — Jeffrey J Restifo
(74) *Attorney, Agent, or Firm* — Sughrue Mion, PLLC (57) ABSTRACT

During a predetermined drive in which a hybrid vehicle is driven with shutting off gates of a first inverter and a second inverter and operating an engine, the hybrid vehicle controls the engine and a step-up/down converter, such that a reverse voltage of a first motor is higher than a voltage of a high voltage-side power line. In the event of an increase in an operation amount of an accelerator during the predetermined drive, the hybrid vehicle controls the engine and the step-up/down converter to limit an increment of a difference between the reverse voltage of the first motor and the voltage of the high voltage-side power line when a temperature of the step-up/down converter is equal to or higher than a predetermined temperature, compared with an increment of the difference when the temperature of the step-up/down converter is lower than the predetermined temperature.

3 Claims, 4 Drawing Sheets

(56) References Cited

U.S. PATENT DOCUMENTS

| | | | | |
|---|---|---|---|---|
| 7,822,535 B2* | 10/2010 | Yaguchi | ................ | B60K 6/445 701/112 |
| 7,923,866 B2* | 4/2011 | Ichikawa | ............. | B60L 3/0046 307/82 |
| 8,040,083 B2* | 10/2011 | Okamura | ............. | H02P 29/032 318/139 |
| 8,054,031 B2* | 11/2011 | Uechi | ..................... | H02P 29/68 318/800 |
| 8,200,384 B2* | 6/2012 | Ichikawa | ............. | B60W 20/13 701/22 |
| 8,256,547 B2* | 9/2012 | Ichikawa | ............. | B60W 10/24 180/65.265 |
| 8,267,207 B2* | 9/2012 | Ichikawa | ............. | B60W 20/13 180/65.1 |
| 8,297,391 B2* | 10/2012 | Oyobe | .................... | B60K 6/26 180/65.275 |
| 8,473,136 B2* | 6/2013 | Kato | .................... | B60W 10/26 701/22 |
| 8,504,232 B2* | 8/2013 | Aoki | ..................... | B60K 6/445 180/65.29 |
| 8,509,978 B2* | 8/2013 | Kato | ........................ | H02J 5/00 701/22 |
| 8,515,605 B2* | 8/2013 | Takaoka | ................ | B60K 6/365 701/22 |
| 8,527,126 B2* | 9/2013 | Yamamoto | .......... | B60L 11/1861 701/22 |
| 8,538,616 B2* | 9/2013 | Yamamoto | ............ | B60W 20/13 701/22 |
| 8,543,271 B2* | 9/2013 | Yamamoto | ............ | B60K 6/445 180/65.265 |
| 8,565,953 B2* | 10/2013 | Kato | .................... | B60K 6/445 701/22 |
| 8,571,733 B2* | 10/2013 | Yamamoto | ............ | B60L 3/0046 701/22 |
| 8,571,734 B2* | 10/2013 | Yamamoto | ............ | B60L 3/0092 701/22 |
| 8,579,059 B2* | 11/2013 | Teraya | ................... | B60K 6/445 180/65.265 |
| 8,620,503 B2* | 12/2013 | Ito | ........................ | B60W 20/10 701/22 |
| 8,624,426 B2* | 1/2014 | Kato | ...................... | B60K 6/445 307/9.1 |
| 8,631,887 B2* | 1/2014 | Teraya | ............... | F02D 41/1495 180/65.28 |
| 8,669,855 B2* | 3/2014 | Suzuki | ................... | B60K 6/445 340/438 |
| 8,683,244 B2* | 3/2014 | Minegishi | ............... | B60K 6/48 713/320 |
| 8,818,595 B2* | 8/2014 | Tamagawa | ............ | B60K 6/442 701/22 |
| 8,909,399 B2* | 12/2014 | Kato | ..................... | B60K 6/365 701/22 |
| 9,018,895 B2* | 4/2015 | Endo | ...................... | B60K 6/445 320/104 |
| 9,327,591 B2* | 5/2016 | Yamamoto | ............ | B60K 6/445 |
| 9,493,150 B2* | 11/2016 | Endo | ........................ | B60K 6/46 |
| 9,527,507 B2* | 12/2016 | Oba | ...................... | B60W 20/50 |
| 9,545,916 B2* | 1/2017 | Kamatani | ............. | B60K 6/445 |
| 9,707,957 B2* | 7/2017 | Shimizu | ................ | B60W 20/50 |
| 9,709,444 B2* | 7/2017 | Nozawa | ................... | G01K 3/10 |
| 10,086,825 B2* | 10/2018 | Shimizu | ............. | B60L 11/1861 |
| 10,093,305 B2* | 10/2018 | Shimizu | ............. | B60W 20/14 |
| 2016/0114788 A1* | 4/2016 | Kamatani | ............. | B60K 6/445 701/22 |
| 2017/0088127 A1* | 3/2017 | Matsumura | ............. | H02P 29/60 |

* cited by examiner

HYBRID VEHICLE

CROSS-REFERENCE TO RELATED APPLICATION

This application claims priority to Japanese Patent Application No. 2017-200411 filed on Oct. 16, 2017, the contents of which is incorporated herein by reference.

TECHNICAL FIELD

The present disclosure relates to a hybrid vehicle or more specifically to a hybrid vehicle including an engine, a planetary gear, two motors, two inverters, a power storage device and a step-up/down converter.

BACKGROUND

A proposed configuration of a hybrid vehicle includes an engine; a first motor configured to generate a reverse voltage by rotation; a planetary gear configured to include a sun gear, a carrier and a ring gear respectively connected with the first motor, the engine and an output shaft coupled with drive wheels; a second motor connected with the output shaft; a first inverter configured to drive the first motor; a second inverter configured to drive the second motor; a battery; and a converter connected with a first power line, which the battery is connected with, and with a second power line, which the first inverter and the second inverter are connected with, and configured to transmit electric power between the first power line and the second power line with regulation of a voltage of the second power line (as described in, for example, JP 2017-65604A). During a run of the hybrid vehicle with shutting off gates of the first inverter and the second inverter and operating the engine, the hybrid vehicle of this configuration controls the engine and the converter such that the reverse voltage of the first motor is higher than the voltage of the second power line. This causes the first motor to generate a reverse torque, and outputs a drive torque as a reactive force of this reverse torque to the output shaft to enable the hybrid vehicle to run forward.

CITATION LIST

Patent Literature

PTL 1: JP2017-065604A

SUMMARY

Technical Problem

During a drive in which the hybrid vehicle of this configuration is driven with shutting off the gates of the first inverter and the second inverter and operating the engine, an increase in a difference between the reverse voltage of the first motor and the voltage of the second power line basically increases the electric current that is flowed from the first motor via the converter to the battery and thereby increases the reverse torque of the first motor. An increase in the electric current that is flowed from the first motor via the converter to the battery makes it likely that the converter has a temperature rise and thereby overheats.

A hybrid vehicle of the present disclosure mainly aims to suppress a step-up/down converter from overheating.

Solution to Problem

In order to achieve the above primary object, the hybrid vehicle of the disclosure is implemented by an aspect described below.

The present disclosure is directed to a hybrid vehicle. The hybrid vehicle includes an engine, a first motor configured to generate a reverse voltage by rotation, a planetary gear configured to include three rotational elements respectively connected with three axes of the first motor, the engine, and a driveshaft coupled with drive wheels, such that the first motor, the engine and the driveshaft are aligned in this sequence in an alignment chart, a second motor configured to input and output power into and from the driveshaft, a first inverter configured to drive the first motor, a second inverter configured to drive the second motor, a power storage device, a step-up/down converter connected with a low voltage-side power line, which the power storage device is connected with, and with a high voltage-side power line, which the first inverter and the second inverter are connected with, and configured to transmit electric power between the low voltage-side power line and the high voltage-side power line with regulation of a voltage of the high voltage-side power line, and a control device configured to control the engine and the step-up/down converter such that a reverse voltage of the first motor is higher than the voltage of the high voltage-side power line, during a predetermined drive in which the hybrid vehicle is driven with shutting off gates of the first inverter and the second inverter and operating the engine. In an event of an increase in an operation amount of an accelerator during the predetermined drive, the control device controls the engine and the step-up/down converter to limit an increment of a difference between the reverse voltage of the first motor and the voltage of the high voltage-side power line when a temperature of the step-up/down converter is equal to or higher than a predetermined temperature, compared with an increment of the difference when the temperature of the step-up/down converter is lower than the predetermined temperature.

During the predetermined drive in which the hybrid vehicle is driven with shutting off the gates of the first inverter and the second inverter and operating the engine, the hybrid vehicle of this aspect controls the engine and the step-up/down converter such that the reverse voltage of the first motor is higher than the voltage of the high voltage-side power line. Such control causes the first motor to generate a regenerative torque (reverse torque) corresponding to the voltage difference between the reverse voltage of the first motor and the voltage of the high voltage-side power line, and enables a reactive torque of this regenerative torque to be output to the driveshaft as a drive torque (forward torque) and thereby cause the hybrid vehicle to run forward. In the event of an increase in the operation amount of the accelerator during the predetermined drive, the hybrid vehicle of this aspect controls the engine and the step-up/down converter to limit the increment of the difference between the reverse voltage of the first motor and the voltage of the high voltage-side power line when the temperature of the step-up/down converter is equal to or higher than the predetermined temperature, compared with the increment of the difference when the temperature of the step-up/down converter is lower than the predetermined temperature. The "predetermined temperature" is determined to be a temperature rather lower than an overheat temperature of the step-up/down converter. Such control suppresses an increase in electric current that is flowed from the first motor via the step-up/down converter to the power storage device, due to an increase in the difference between the reverse voltage of the first motor and the voltage of the high voltage-side power line. As a result, this suppresses a temperature rise of the step-up/down converter and thereby suppresses the step-up down converter from overheating.

DESCRIPTION OF EMBODIMENTS

The following describes aspects of the present disclosure with reference to some embodiments.

Figure 1:
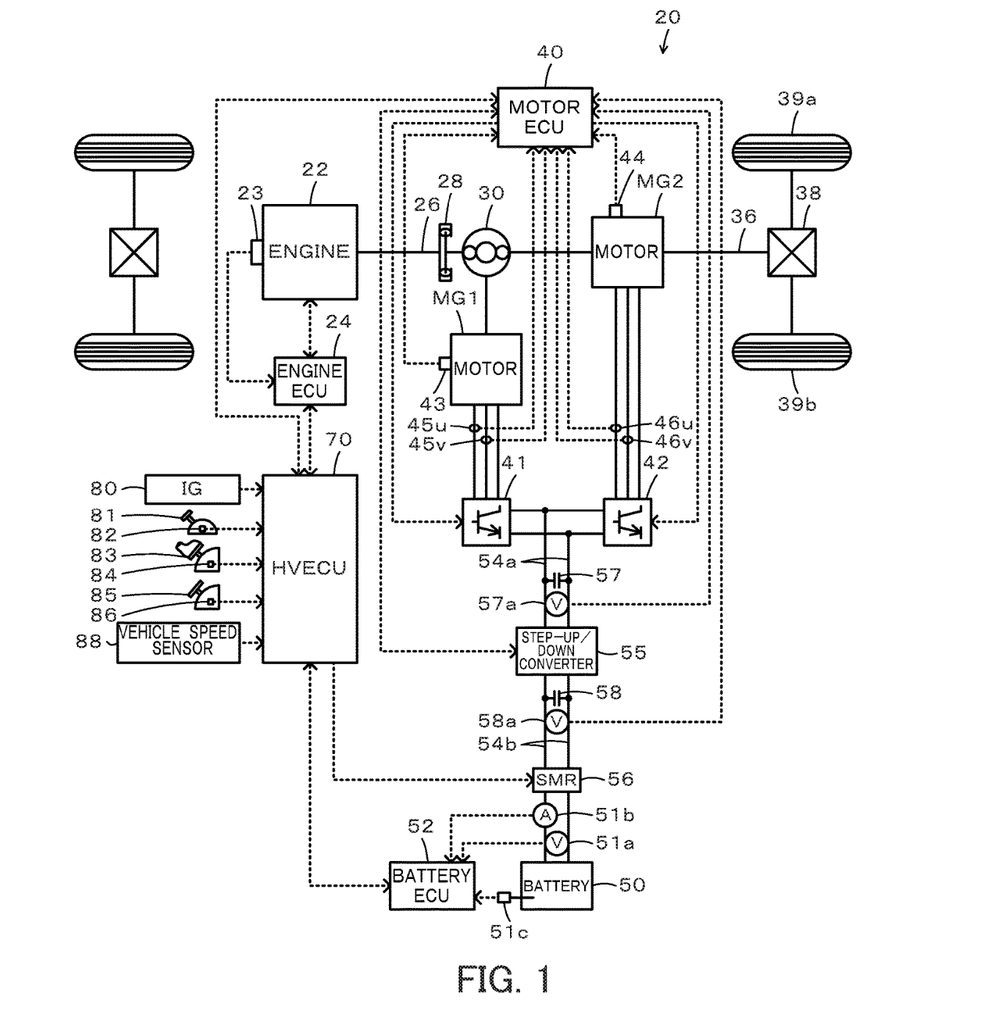
FIG. 1 is a configuration diagram illustrating the schematic configuration of a hybrid vehicle 20 according to one embodiment of the present disclosure.
Figure 2:
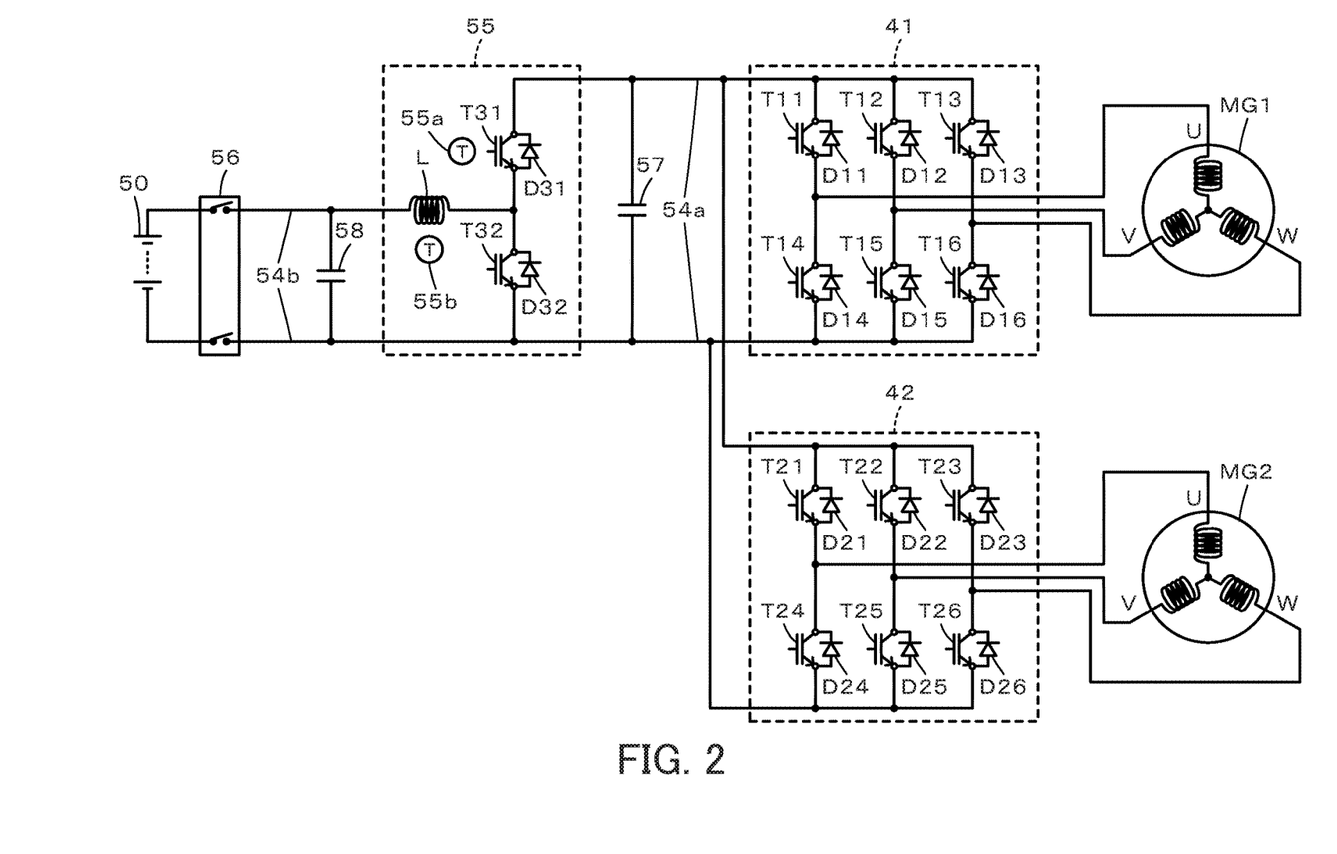
FIG. 2 is a configuration diagram illustrating the schematic configuration of an electric drive system including motors MG1 and MG2.

FIG. 1 is a configuration diagram illustrating the schematic configuration of a hybrid vehicle 20 according to one embodiment of the present disclosure. FIG. 2 is a configuration diagram illustrating the schematic configuration of an electric drive system including motors MG1 and MG2. As illustrated, the hybrid vehicle 20 of the embodiment includes an engine 22, a planetary gear 30, motors MG1 and MG2, inverters 41 and 42, a step-up/down converter 55, a battery 50 as a power storage device, a system main relay 56, and a hybrid electronic control unit (hereinafter referred to as "HVECU") 70.

The engine 22 is configured as an internal combustion engine to output power using, for example, gasoline or light oil as a fuel and is connected with a carrier of the planetary gear 30 via a damper 28. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28 as described above.

The motor MG1 is configured as a synchronous generator motor including a rotor with permanent magnets embedded therein and a stator with three-phase coils wound thereon. The rotor of this motor MG1 is connected with the sun gear of the planetary gear 30 as described above. The motor MG2 is also configured as a synchronous generator motor like the motor MG1. A rotor of this motor MG2 is connected with the driveshaft 36.

The inverters 41 and 42 are used to drive the motors MG1 and MG2. As shown in FIG. 2, the inverter 41 is connected with high voltage-side power lines 54a and includes six transistors T11 to T16 serving as six switching elements and six diodes D11 to D16 that are respectively connected in parallel to the six transistors T11 to T16. The transistors T11 to T16 are arranged in pairs, such that two transistors in each pair respectively serve as a source and a sink relative to a positive electrode line and a negative electrode line of the high voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 regulates the rates of ON times of the respective pairs of the transistors T11 to T16 to provide a rotating magnetic field in the three-phase coils and thereby rotate and drive the motor MG1. Like the inverter 41, the inverter 42 is also connected with the high voltage-side power lines 54a and includes six transistors T21 to T26 and six diodes D21 to D26. When a voltage is applied to the inverter 42, the motor ECU 40 regulates the rates of ON times of the respective pairs of the transistors T21 to T26 to provide a rotating magnetic field in the three-phase coils and thereby rotate and drive the motor MG2.

The step-up/down converter 55 is connected with the high voltage-side power lines 54a and with low voltage-side power lines 54b and includes two transistors T31 and T32 serving as two switching elements, two diodes D31 and D32 respectively connected in parallel to the two transistors T31 and T32, and a reactor L. The transistor T31 is connected with the positive electrode line of the high voltage-side power lines 54a. The transistor T32 is connected with the transistor T31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 regulates the rates of ON times of the transistors T31 and T32, such that the step-up/down converter 55 steps up an electric power of the low voltage-side power lines 54b and supplies the stepped-up electric power to the high voltage-side power lines 54a, while stepping down an electric power of the high voltage-side power lines 54a and supplying the stepped-down electric power to the low voltage-side power lines 54b, accompanied with regulation of a voltage VH of the high voltage-side power lines 54a. A capacitor 57 for smoothing is mounted to the positive electrode line and the negative electrode line of the high voltage-side power lines 54a. A capacitor 58 for smoothing is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. As shown in FIG. 1, signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2. The input signals also include a temperature Tsw of the transistor T31 from a temperature sensor 55a configured to detect the temperature of the transistor T31 of the step-up/down converter 55, and a temperature TL of the reactor L from a temperature sensor 55b configured to detect the temperature of the reactor L of the step-up/down converter 55. The input signals also include a voltage (high voltage-side voltage) VH of the capacitor 57 (high voltage-side power lines 54a) from a voltage sensor 57a mounted between terminals of the capacitor 57 and a voltage (low voltage-side voltage) VL of the capacitor 58 (low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors T11 to T16 of the inverter 41 and the transistors T21 to T26 of the inverter 42 and switching control signals to the transistors T31 and T32 of the step-up/down converter 55. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery having a rated voltage of, for example, 200 V and is connected with the low voltage-side power lines 54b. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. Examples of the shift position SP include a parking position (P position), a reverse position (R position), a neutral position (N position), a drive position (D position) and a brake position (B position). The B position provides an equivalent driving force in an accelerator-on state to the driving force at the D position and a greater driving force in an accelerator-off state than the driving force at the D position. The HVECU 70 is connected with the engine ECU 24, the motor ECU 40 and the battery ECU 52 via the respective communication ports as described above.

The hybrid vehicle 20 of the embodiment having the above configuration sets a required driving force of the driveshaft 36 based on the accelerator position Acc and the vehicle speed V and controls the operations of the engine 22 and the motors MG1 and MG2 such that a required power meeting the required driving force is output to the driveshaft 36. The hybrid vehicle 20 of the embodiment may employ, for example, the following three modes (1) to (3) as operation modes of the engine 22 and the motors MG1 and MG2:

(1) torque conversion operation mode that denotes a mode of operating and controlling the engine 22 such that a power corresponding to the required power is output from the engine 22, and of driving and controlling the motors MG1 and MG2 such that the whole of the power output from the engine 22 is subjected to torque conversion by the planetary gear 30 and the motors MG1 and MG2 and that the required power is output to the driveshaft 36;

(2) charge-discharge operation mode that denotes a mode of operating and controlling the engine 22 such that a power corresponding to the sum of the required power and an electric power required for charging or discharging the battery 50 is output from the engine 22, and of driving and controlling the motors MG1 and MG2 such that the whole or part of the power output from the engine 22 is subjected to torque conversion by the planetary gear 30 and the motors MG1 and MG2 accompanied with charging or discharging of the battery 50 and that the required power is output to the driveshaft 36; and (3) motor operation mode that denotes a mode of stopping operation of the engine 22 and of driving and controlling the motor MG2 such that the required power is output to the driveshaft 36.

In the event of an abnormality occurring in any of the inverters 41 and 42 and the sensors used to control the inverters 41 and 42 (for example, the current sensors 45u, 45v, 46u and 46v) during operation of the engine 22, the hybrid vehicle 20 of the embodiment is driven in an inverter-less drive (emergency drive) with shutting off the gates of the inverters 41 and 42 (i.e., setting off all the transistors T11 to T16 and T21 to T26) and operating the engine 22.

In the inverter-less drive, the HVECU 70 sets a target rotation speed Nm1* of the motor MG1 and a target voltage VH* of the high voltage-side power lines 54a, such that a reverse voltage Vcef1 generated by rotation of the motor MG1 is higher than the voltage VH of the high voltage-side power lines 54a. The reverse voltage Vcef1 of the motor MG1 corresponds to the product of the angular velocity ωm1 of the motor MG1 and a reverse voltage constant Km1.

The HVECU 70 subsequently calculates a target rotation speed Ne* of the engine 22 according to Expression (1) given below using the target rotation speed Nm1* of the motor MG1, the rotation speed Nm2 of the motor MG2 (i.e., a rotation speed Nd of the driveshaft 36) and a gear ratio ρ (number of teeth of the sun gear/number of teeth of the ring gear) of the planetary gear 30 and sends the calculated target rotation speed Ne* of the engine 22 to the engine ECU 24, while sending the target voltage VH* of the high voltage-side power lines 54a to the motor ECU 40. The rotation speed Nm2 of the motor MG2 is calculated based on the rotational position θm2 of the rotor of the motor MG2 detected by the rotational position detection sensor 44 and is input from the motor ECU 40 by communication. When receiving the target rotation speed Ne* of the engine 22, the engine ECU 24 performs intake air flow control, fuel injection control and ignition control of the engine 22, such that the rotation speed Ne of the engine 22 becomes equal to the target rotation speed Ne*. When receiving the target voltage VH* of the high voltage-side power lines 54a, the motor ECU 40 performs switching control of the transistors T31 and T32 of the step-up/down converter 55, such that the voltage VH of the high voltage-side power lines 54a becomes equal to the target voltage VH*.

$$Ne^* = (Nm1^* \cdot \rho + Nm2)/(1+\rho) \quad (1)$$

Figure 3:
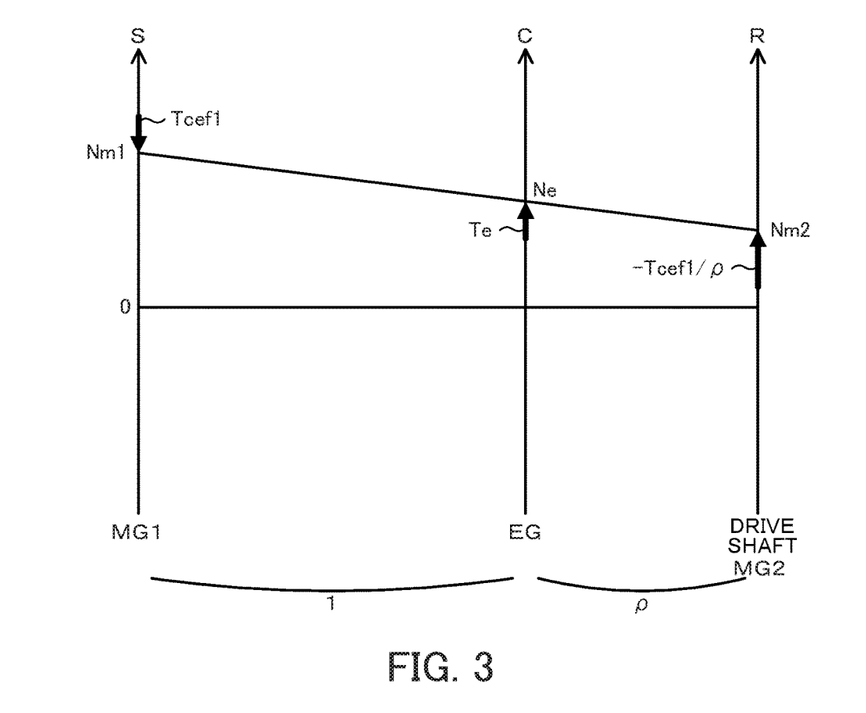
FIG. 3 is a diagram illustrating one example of an alignment chart of a planetary gear 30 in an inverter-less drive.

FIG. 3 is a diagram illustrating one example of an alignment chart of the planetary gear 30 in the inverter-less drive. In FIG. 3, an S axis on the left side shows the rotation speed of the sun gear of the planetary gear 30 that is equal to the rotation speed Nm1 of the motor MG1. A C axis shows the rotation speed of the carrier of the planetary gear 30 that is equal to the rotation speed Ne of the engine 22. An axis R shows the rotation speed of the ring gear of the planetary gear 30 that is equal to the rotation speed Nm2 of the motor MG2 (and equal to the rotation speed Nd of the driveshaft 36). Expression (1) given above can readily be derived from FIG. 3.

In the inverter-less drive, the higher reverse voltage Vcef1 of the motor MG1 than the voltage VH of the high voltage-side power lines 54a causes a regenerative torque (reverse torque) Tcef1 to be generated by the motor MG1 and causes a reactive torque (−Tcef1/ρ) of this regenerative torque Tcef1 to be output as a drive torque (forward torque) Td to the driveshaft 36 and thereby drive the hybrid vehicle 20. More specifically, the regenerative torque Tcef1 of the motor MG1 is generated when the motor MG1 is rotated by the operation of the engine 22 and an electric current (power) corresponding to a difference (Vcef1−VH) between the reverse voltage Vcef1 of the motor MG1 and the voltage VH of the high voltage-side power lines 54a is supplied to the battery 50 via the step-up/down converter 55 (the transistor T31 and the reactor L). An increase of this difference (Vcef1-VH) increases the electric current (power) that is flowed from the motor MG1-side via the step-up/down converter 55 to the battery 50-side, increases the regenerative torque Tcef1 of the motor MG1, and increases the drive torque Td of the driveshaft 36.

Figure 4:
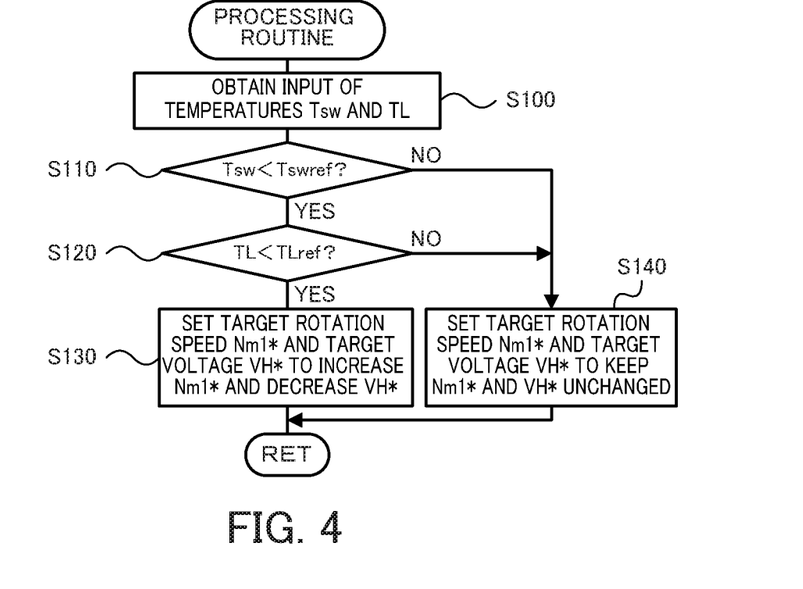
FIG. 4 is a flowchart showing one example of a processing routine performed by an HVECU 70 in the event of an increase in accelerator position Acc during the inverter-less drive.

The following describes operations of the hybrid vehicle 20 of the embodiment having the above configuration and more specifically a series of operations in the event of an increase in the accelerator position Acc during the inverter-less drive. FIG. 4 is a flowchart showing one example of a processing routine performed by the HVECU 70 in the event of an increase in the accelerator position Acc during the inverter-less drive.

When the processing routine of FIG. 4 is triggered, the HVECU 70 first obtains the input of the temperature Tsw of the transistor T31 and the temperature TL of the reactor L (step S100). The temperature T31 of the transistor T31 is a value that is detected by the temperature sensor 55a and that is input from the motor ECU 40 by communication. The temperature TL of the reactor L is a value that is detected by the temperature sensor 55b and that is input from the motor ECU 40 by communication.

After the data input, the HVECU 70 compares the input temperature Tsw of the transistor T31 with a reference value Tswref (step S110) and compares the input temperature TL of the reactor L with a reference value TLref (step S120). The reference value Tswref and the reference value TLref are threshold values used to determine whether the step-up/down converter 55 (more specifically, the transistor T31 and the reactor L) is likely to overheat. The reference value Tswref is determined to be a temperature that is rather lower than an overheat temperature Tswoh of the transistor T31 and may be, for example, 140° C., 150° C. or 160° C. The reference value TLref is determined to be a temperature that is rather lower than an overheat temperature TLoh of the reactor L and may be, for example, 110° C., 120° C. or 130° C.

When the temperature Tsw of the transistor T31 is lower than the reference value Tswref at step S110 and the temperature TL of the reactor L is lower than the reference value TLref at step S120, the HVECU 70 determines that the step-up/down converter 55 (the transistor T31 and the reactor L) is not likely to (is sufficiently unlikely to) overheat. The HVECU 70 then increases the target rotation speed Nm1* of the motor MG1 and decreases the target voltage VH* of the high voltage-side power lines 54a (step S130) and terminates this routine. The procedure of the embodiment sets values according to the accelerator position Acc to the target rotation speed Nm1* of the motor MG1 and to the target voltage VH* of the high voltage-side power lines 54a. More specifically, a value that increases with an increase in the accelerator position Acc is set to the target rotation speed Nm1* of the motor MG1, and a value that decreases with an increase in the accelerator position Acc is set to the target voltage VH* of the high voltage-side power lines 54a. After setting the target rotation speed Nm1* of the motor MG1 and the target voltage VH* of the high voltage-side power lines 54a, the HVECU 70 sets the target rotation speed Ne* of the engine 22 according to Expression (1) given above and sends the target rotation speed Ne* of the engine 22 to the engine ECU 24, while sending the target voltage VH* of the high voltage-side power lines 54a to the motor ECU 40 as described above. The engine ECU 24 controls the engine 22 using the target rotation speed Ne* of the engine 22, and the motor ECU 40 controls the step-up/down converter 55 using the target voltage VH* of the high voltage-side power lines 54*a*.

Increasing the rotation speed Nm1 of the motor MG1 and decreasing the voltage VH of the high voltage-side power lines 54*a* in this manner increases the difference (Vcef1−VH) between the reverse voltage Vcef1 of the motor MG1 and the voltage VH of the high voltage-side power lines 54*a*. This results in increasing the regenerative torque Tcef1 of the motor MG1 and thereby increasing the drive torque Td of the driveshaft 36. As a result, this increases the drive torque Td of the driveshaft 36 with an increase in the accelerator position Acc.

When the temperature Tsw of the transistor T31 is equal to or higher than the reference value Tswref at step S110 or when the temperature TL of the reactor L is equal to or higher than the reference value TLref at step S120, on the other hand, the HVECU 70 determines that the step-up/down converter 55 (the transistor T31 and the reactor L) is likely to overheat. The HVECU 70 then keeps the target rotation speed Nm1* of the motor MG1 and the target voltage VH* of the high voltage-side power lines 54*a* unchanged (step S140) and terminates this routine.

Keeping the rotation speed Nm1 of the motor MG1 and the voltage VH of the high voltage-side power lines 54*a* unchanged in this manner keeps the difference (Vcef1−VH) between the reverse voltage Vcef1 of the motor MG1 and the voltage VH of the high voltage-side power lines 54*a* unchanged. This suppresses an increase in electric current (power) that is flowed from the motor MG1-side via the step-up/down converter 55 to the battery 50-side and suppresses a temperature rise of the step-up/down converter 55 (the transistor T31 and the reactor L). This accordingly suppresses the step-up/down converter 55 from overheating (more specifically, suppresses the temperature Tsw of the transistor T31 from becoming equal to or higher than the overheat temperature Tswoh and suppresses the temperature TL of the reactor L from becoming equal to or higher than the overheat temperature TLoh). As a result, this protects the step-up/down converter 55. In this state, the regenerative torque Tcef of the motor MG1 and the drive torque Td of the driveshaft 36 are kept unchanged.

As described above, in the event of an increase in the accelerator position Acc during the inverter-less drive, when the temperature Tsw of the transistor T31 is equal to or higher than the reference value Tswref or when the temperature TL of the reactor L is equal to or higher than the reference value TLref, the hybrid vehicle 20 of the embodiment keeps both the rotation speed Nm1 of the motor MG1 and the voltage VH of the high voltage-side power lines 54*a* unchanged and thereby keeps the difference (Vcef1−VH) between the reverse voltage Vcef1 of the motor MG1 and the voltage VH of the high voltage-side power lines 54*a* unchanged. This suppresses an increase in the electric current (power) that is flowed from the motor MG1-side to the battery 50-side and suppresses a temperature rise of the step-up/down converter 55 (temperature rises of the transistor T31 and the reactor L), thereby suppressing the step-up/down converter 55 from overheating. As a result, this protects the step-up/down converter 55.

In the event of an increase in the accelerator position Acc during the inverter-less drive, when the temperature Tsw of the transistor T31 is equal to or higher than the reference value Tswref or when the temperature TL of the reactor L is equal to or higher than the reference value TLref, the hybrid vehicle 20 of the embodiment keeps both the rotation speed Nm1 of the motor MG1 and the voltage VH of the high voltage-side power lines 54*a* unchanged and thereby keeps the difference (Vcef1−VH) between the reverse voltage Vcef1 of the motor MG1 and the voltage VH of the high voltage-side power lines 54*a* unchanged. A modification may decrease both the rotation speed Nm1 of the motor MG1 and the voltage VH of the high voltage-side power lines 54*a*, in order to keep the difference (Vcef1−VH) unchanged. A decrease in the rotation speed Nm1 of the motor MG1 decreases the rotation speed Ne of the engine 22 and thereby reduces the fuel consumption of the engine 22. A decrease in the voltage VH of the high voltage-side power lines 54*a* reduces the loss of the step-up/down converter 55. This modification accordingly keeps the difference (Vcef1−VH) unchanged, while reducing the fuel consumption of the engine 22 and the loss of the step-up/down converter 55.

In the event of an increase in the accelerator position Acc during the inverter-less drive, when the temperature Tsw of the transistor T31 is equal to or higher than the reference value Tswref or when the temperature TL of the reactor L is equal to or higher than the reference value TLref, the hybrid vehicle 20 of the embodiment keeps the difference (Vcef1−VH) between the reverse voltage Vcef1 of the motor MG1 and the voltage VH of the high voltage-side power lines 54*a* unchanged.

In the event of an increase in the accelerator position Acc during the inverter-less drive, a modification may increase the difference (Vcef1−VH) by a smaller increment when the temperature Tsw of the transistor T31 is equal to or higher than the reference value Tswref or when the temperature TL of the reactor L is equal to or higher than the reference value TLref, compared with the increment of the difference (Vcef1−VH) when the temperature Tsw of the transistor T31 is lower than the reference value Tswref and the temperature TL of the reactor L is lower than the reference value TLref. The configuration of this modification increases the drive torque Td of the driveshaft 36 with suppressing the step-up/down converter 55 from overheating to some extent, compared with a configuration that increases the difference (Vcef1−VH) by an increment equal to the increment of the difference (Vcef1−VH) when the temperature Tsw of the transistor T31 is lower than the reference value Tswref and the temperature TL of the reactor L is lower than the reference value TLref.

In the event of an increase in the accelerator position Acc during the inverter-less drive, another modification may decrease the difference (Vcef1−VH) when the temperature Tsw of the transistor T31 is equal to or higher than the reference value Tswref or when the temperature TL of the reactor L is equal to or higher than the reference value TLref. This configuration more effectively suppresses the step-up/down converter 55 from overheating. This modification decreases the regenerative torque Tcef of the motor MG1 and thereby decreases the drive torque Td of the driveshaft 36.

During the inverter-less drive, the hybrid vehicle 20 of the embodiment regulates the target rotation speed Nm1* (rotation speed Nm1) of the motor MG1 and the target voltage VH* (voltage VH) of the high voltage-side power lines 54*a*, so as to adjust the difference (Vcef1−VH), the regenerative torque Tcef1 of the motor MG1 and the drive torque Td of the driveshaft 36. A modification may keep one of the target rotation speed Nm1* of the motor MG1 and the target voltage VH* of the high voltage-side power lines 54*a* unchanged and regulate the other, so as to adjust the difference (Vcef1−VH), the regenerative torque Tcef1 of the motor MG1 and the drive torque Td of the driveshaft 36.

During the inverter-less drive, the hybrid vehicle 20 of the embodiment uses the temperature Tsw of the transistor T31 and the temperature TL of the reactor L to determine whether the step-up/down converter 55 is likely to overheat. A modification may use only one of the temperature Tsw of the transistor T31 and the temperature TL of the reactor L to determine whether the step-up/down converter 55 is likely to overheat. Another modification may use, for example, the temperature of a substrate equipped with the transistors T31 and T32 and the diodes D31 and D32, in place of the temperature Tsw of the transistor T31 or the temperature TL of the reactor L, to determine whether the step-up/down converter 55 is likely to overheat.

The hybrid vehicle 20 of the embodiment uses the battery 50 as the power storage device. The power storage device used may, however, be any device that is capable of accumulating electricity, such as a capacitor.

The hybrid vehicle 20 of the embodiment is provided with the engine ECU 24, the motor ECU 40, the battery ECU 52 and the HVECU 70. According to a modification, at least two of them may be configured as one single electronic control unit.

In the hybrid vehicle of the above aspect, in the event of the increase in the operation amount of the accelerator during the predetermined drive, when the temperature of the step-up/down converter is equal to or higher than the predetermined temperature, the control device may control the engine and the step-up/down converter to keep the difference unchanged. This configuration more effectively suppresses the step-up/down converter from overheating.

In this case, in the event of the increase in the operation amount of the accelerator during the predetermined drive, when the temperature of the step-up/down converter is equal to or higher than the predetermined temperature, the control device may control the engine and the step-up/down converter to keep a rotation speed of the first motor and the voltage of the high voltage-side power line unchanged, so as to keep the difference unchanged.

The following describes the correspondence relationship between the primary elements of the above embodiment and the primary elements of the disclosure described in Summary. The engine 22 of the embodiment corresponds to the "engine", the motor MG1 corresponds to the "first motor", the planetary gear 30 corresponds to the "planetary gear", the motor MG2 corresponds to the "second motor", the inverter 41 corresponds to the "first inverter", the inverter 42 corresponds to the "second inverter", the battery 50 corresponds the "power storage device", the boost converter 55 corresponds to the "boost converter", and the HVECU 70, the engine ECU 24, the motor ECU 40 and the battery ECU 52 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

The invention claimed is:
1. A hybrid vehicle, comprising:
an engine;
a first motor configured to generate a reverse voltage by rotation;
a planetary gear configured to include three rotational elements respectively connected with three axes of the first motor, the engine, and a driveshaft coupled with drive wheels, such that the first motor, the engine and the driveshaft are aligned in this sequence in an alignment chart;
a second motor configured to input and output power into and from the driveshaft;
a first inverter configured to drive the first motor;
a second inverter configured to drive the second motor;
a power storage device;
a step-up/down converter connected with a low voltage-side power line, which the power storage device is connected with, and with a high voltage-side power line, which the first inverter and the second inverter are connected with, and configured to transmit electric power between the low voltage-side power line and the high voltage-side power line with regulation of a voltage of the high voltage-side power line; and
a control device configured to control the engine and the step-up/down converter such that a reverse voltage of the first motor is higher than the voltage of the high voltage-side power line, during a predetermined drive in which the hybrid vehicle is driven with shutting off gates of the first inverter and the second inverter and operating the engine, wherein
in an event of an increase in an operation amount of an accelerator during the predetermined drive, the control device controls the engine and the step-up/down converter to limit an increment of a difference between the reverse voltage of the first motor and the voltage of the high voltage-side power line when a temperature of the step-up/down converter is equal to or higher than a predetermined temperature, compared with an increment of the difference when the temperature of the step-up/down converter is lower than the predetermined temperature.

2. The hybrid vehicle according to claim 1,
wherein in the event of the increase in the operation amount of the accelerator during the predetermined drive, when the temperature of the step-up/down converter is equal to or higher than the predetermined temperature, the control device controls the engine and the step-up/down converter to keep the difference unchanged.

3. The hybrid vehicle according to claim 2,
wherein in the event of the increase in the operation amount of the accelerator during the predetermined drive, when the temperature of the step-up/down converter is equal to or higher than the predetermined temperature, the control device controls the engine and the step-up/down converter to keep a rotation speed of the first motor and the voltage of the high voltage-side power line unchanged, so as to keep the difference unchanged.

* * * * *